(12) United States Patent
Xie

(10) Patent No.: US 8,692,205 B2
(45) Date of Patent: Apr. 8, 2014

(54) COMBINED METHOD FOR DETECTING AND POSITIONING HIGH ENERGY RADIATION

(75) Inventor: Shuping Xie, Shanghai (CN)

(73) Assignee: Shanghai Center for Biomedical Engineering, Shanghai (CN)

( * ) Notice: Subject to any disclaimer, the term of this patent is extended or adjusted under 35 U.S.C. 154(b) by 209 days.

(21) Appl. No.: 13/319,075

(22) PCT Filed: Apr. 28, 2010

(86) PCT No.: PCT/CN2010/072272
§ 371 (c)(1),
(2), (4) Date: Nov. 4, 2011

(87) PCT Pub. No.: WO2010/127598
PCT Pub. Date: Nov. 11, 2010

(65) Prior Publication Data
US 2012/0056094 A1    Mar. 8, 2012

(30) Foreign Application Priority Data
May 8, 2009   (CN) .......................... 2009 1 0083671

(51) Int. Cl.
*G01T 1/20*   (2006.01)
(52) U.S. Cl.
USPC ........................................................ 250/366
(58) Field of Classification Search
USPC ........................................................ 250/366
See application file for complete search history.

(56) References Cited

U.S. PATENT DOCUMENTS

| 6,288,399 B1* | 9/2001 | Andreaco et al. ............. 250/368 |
| 2011/0062340 A1* | 3/2011 | Gagnon .................. 250/363.03 |

FOREIGN PATENT DOCUMENTS

| CN | 2708331 Y | 7/2003 |
| JP | 64-059187 | 3/1989 |

* cited by examiner

*Primary Examiner* — David Porta
*Assistant Examiner* — Hugh H Maupin
(74) *Attorney, Agent, or Firm* — Blakely Sokoloff Taylor & Zafman

(57) ABSTRACT

A combined method for detecting and positioning high energy radiation, belonging to the radiation detection and imaging technology field, comprises: arranging scintillation crystals for capturing high energy radiation into a regular array; assembling a plurality of PMTs with different sizes into a combined array where smaller PMT is located at the center of larger PMTs; forming a combined high energy radiation detector by bonding the scintillation crystal array and the combined PMT array with an optical adhesive; when a high energy gamma ray is incident into the scintillation crystal array, scintillation light is generated and amplified by the combined PMT array into electrical pulse signals; then obtaining the position coordinates, energy and time of the high energy gamma ray by processing the electrical pulse signals. The method provides more effective and uniform high-energy radiation detection, has higher spatial and energy resolution, and simultaneously has high-speed response.

3 Claims, 4 Drawing Sheets

COMBINED METHOD FOR DETECTING AND POSITIONING HIGH ENERGY RADIATION

CROSS-REFERENCES TO RELATED APPLICATIONS

This is a non-provisional application claiming the benefit of International Application Number PCT/CN2010/072272 filed Apr. 28, 2010.

TECHNICAL FIELD

The present invention relates to the field of radiation detection and imaging technology and, more particularly, to a combined method for detecting and positioning high energy radiation.

BACKGROUND ART

High energy radiation detection technology commonly employs scintillation crystals as a detection material which is capable to block radiation effectively and produce light by absorbing the energy of the radiation, then uses a high gain photomultiplier device to generate electrical pulse signals by photoelectrically converting and amplifying the weak optical signals, and obtains information about energy, time, spatial position, etc. of the high energy radiation by analyzing the pulse signals. This kind of solid-state detector is commonly called a scintillation detector.

When high energy radiation is incident into scintillation crystals, usually photoelectric effect, Compton scattering effect and electron pair effect in different proportions will occur according to the value of the radiation energy, and the radiation energy will therefore be finally entirely absorbed by the scintillation crystals, being accompanied with the release of an extremely weak scintillation light. For the scintillation light in visible or ultraviolet region, all the information of the high energy radiation can be acquired by detecting the photoelectrically converted scintillation light through high-sensitivity signal amplification devices (such as photomultiplier tubes, PMT). For example, the intensity of the output pulse signals of the photomultiplier tubes indicates the energy of the high energy radiation; the occurrence time of the pulse signals indicates the incident time of the high energy radiation; the intensity distribution of the pulse signals in a plurality of photomultiplier tubes indicates the incident position of the high energy radiation. Because of their advantages of high detection efficiency, large signal-to-noise ratio, rapid response, etc., conventional scintillation detectors are widely used in the researches of nuclear medicine, security check, high energy physics and cosmic rays detection, and have become a main means of the current radiation detection technology that is indispensable.

Conventional scintillation detectors have relatively simple structures. Especially, when they are used for detecting and positioning, conventional scintillation detectors usually rely on a structure of a plurality of identical photomultiplier tubes coupled with a scintillation crystal array to determine the incident position of high energy radiation. However, in this structure, there are large blind areas in the gaps between the photomultiplier tubes, leading to a non-uniform distribution of detection efficiency in the entire imaging system of the detector and a low spatial resolution. Therefore, great emphasis is attached to how to improve detection efficiency, imaging uniformity and spatial resolution in radiation detection and imaging technology.

FIG. 1 shows the basic structure of a conventional scintillation detector generally comprising a scintillation crystal array module 1 coupled with 4 photomultiplier tubes (PMTs) 2 having an identical size and shape. FIG. 2 is the top view of the above conventional scintillation detector. As shown in FIG. 2, the scintillation crystal array module 1 covers the surface of the detection windows A, B, C, and D of the 4 PMTs 2. The scintillation crystal array is generally formed of scintillation crystal material rods bonded together with a reflective film. The scintillation crystal array module 1 and the PMT detection windows A, B, C, and D can be either bonded to each other by using a high-transparency optical adhesive, or indirectly coupled with each other by interposing a photoconductive material (such as organic plastics, glass, optical fibers, etc.) between the scintillation crystals and PMTs.

When high energy radiation is incident into the scintillation crystal array, each high energy radiation will excite a single scintillation crystal at the incident position, and enable the scintillation crystal to produce scintillation light by photoelectric effect or Compton scattering effect. According to the characteristics of different scintillation crystal materials, the number of scintillation photons generated is usually in the magnitude of $10^3$~$10^4$, and the corresponding scintillation light has a wavelength of 200 nm~600 nm (in the ranges of ultraviolet or visible light). Due to the reflection effect of the reflective material at the surface of a single scintillation crystal, the scintillation light will be constrained in the single scintillation crystal and be reflected multiple times, and finally transmit from one end of the scintillation crystal into the PMT at the other end of the scintillation crystal. In the case that there is no reflective material coated on the surface of the single scintillation crystal, the scintillation light pass through the scintillation crystal, enter an adjacent scintillation crystal unit and transmit continuously. In the end, the scintillation light will be collected at the incident glass port of the PMT, and pulse signals will be produced. Therefore, the intensity distribution of the pulse signals in the PMTs indicates the incident position of the high energy radiation; the total intensity of the pulse signals is proportional to the incident energy of the high energy radiation; the occurrence time of the pulse signals is related to the incidence time of the high energy radiation; and the spatial positioning accuracy of the detector is determined by the cross sectional dimension of the single scintillation crystal.

For the conventional scintillation detector, a positioning calculation method, commonly known as Anger logical positioning method, can be used to estimate the interacting position of incident high energy radiation based on ratios of different intensities of output pulse signals generated by the 4 PMTs excited by the identical incident high energy radiation. By respectively indicating the intensities of the voltage signals generated by the 4 PMTs by $V_A$, $V_B$, $V_C$ and $V_D$, the spatial positions X and Y, as well as energy E of the high energy radiation can be expressed respectively as:

$$X = \frac{V_B + V_D}{V_A + V_B + V_C + V_D}$$

$$Y = \frac{V_A + V_B}{V_A + V_B + V_C + V_D}$$

$$E = V_A + V_B + V_C + V_D$$

SUMMARY OF THE INVENTION

An objective of the present invention is to provide a combined method for detecting and positioning of high energy radiation, which can complete signal collection for a scintillation detector by using an optimized combination of PMTs with different sizes or shapes, realize functions of detecting, amplifying, positioning, imaging and so on of high energy radiation by bonding a scintillation crystal array with an optical adhesive, and acquire information about time, space and energy of high energy radiation when interacting on the scintillation crystal array.

The combined method for detecting and positioning of high energy radiation provided by the present invention comprises the following steps:

(1) arranging scintillation crystals for capturing high energy radiation into a square array;

(2) assembling a plurality of photomultiplier tubes (PMTs) with different sizes into a combined array where a small-sized PMT is located at center of large-sized PMTs;

(3) forming a combined high energy radiation detector by directly bonding the scintillation crystal array and the combined PMT array or bonding a photoconductive material between the scintillation crystal array and the combined PMT array with an optical adhesive;

(4) generating scintillation light when high energy radiation is incident into the scintillation crystal array of the combined high energy radiation detector; amplifying the scintillation light by the combined PMT array to form electrical pulse signals; amplifying and decoding the electrical pulse signals; and obtaining position coordinates in the scintillation crystal array of the high energy radiation through a weight distribution of the electrical pulse signals in the combined PMT array.

In the above method, the material of the scintillation crystals can be selected from any one of bismuth germinate, lutetium silicate, lutetium yttrium silicate, gadolinium silicate, barium fluoride, sodium iodide, cesium iodide, lead tungstate and yttrium aluminate.

In the above method, any one of organic plastics, glass and optical fibers can be selected as the photoconductive material.

In the above method, the electrical pulse signals are decoded according to the following method: in a case that the number of PMTs is N, by respectively indicating the intensities of voltage signals generated by the PMTs with $V_1, V_2, V_3, \ldots, V_N$, an X-axis direction position coordinate of the high energy radiation in the scintillation crystal array is calculated by dividing a total sum of the electrical pulse signals of all the PMTs in the X-axis direction by a total sum of the electrical pulse signals of all the PMTs; a Y-axis direction position coordinate of the high energy radiation in the scintillation crystal array is calculated by dividing a total sum of the electrical pulse signals of all the PMTs in the Y-axis direction by the total sum of the electrical pulse signals of all the PMTs; energy of the high energy radiation is calculated by adding up the electrical pulse signals of all the PMTs.

The combined method for detecting and positioning high energy radiation provided by the present invention has features and advantages shown as follows:

1. More effective and more uniform detection of high energy radiation. By adopting a combination of PMTs with different sizes and shapes, the method can effectively reduce the size of blind areas between the PMTs and improve the arrangement density of the PMTs, which therefore improves the detection efficiency and uniformity of weak scintillation light produced by scintillation crystals and leads to a higher imaging quality of high energy radiation detection.

2. A higher spatial resolution. By using PMTs arranged in high density to collect light from all scintillation crystals, the method can improve the yield of effective scintillation light that can be detected, thus reducing statistical noise of pulse signals and improving the imaging resolution of the detection. As different scintillation crystal materials have different light yields, if a detection array consisting of current high-yield LSO or LYSO crystals is used in the combined radiation detection method, a better detection resolution than that of a conventional scintillation detector sold in market can be obtained.

3. A high energy resolution. By using PMTs arranged in high density to effectively collect light from all scintillation crystals, the method is capable to effectively detect more scintillation light, reduce statistical noise of signals, and thus achieve a higher energy resolution in detection.

4. Independent determination without interruption. For a high-resolution type combined high energy radiation detector, as scintillation crystal modules are optically isolated from each other, scintillation light can only transmit within a single crystal array module where the scintillation light is generated, and there is no crosstalk between signals of plural crystal array modules.

5. Rapid response. As the PMT situated at the center part of a combined PMT array has a smaller size, the PMT can be selected to have a shorter response pulse as triggering time. Meanwhile the transit time of signals in PMTs can be greatly reduced, which enables the combined detection method to respond to incident high energy radiation more rapidly and to be potentially applicable in the time-of-flight (TOF) measuring technology.

6. A compact structure. Compared to that of a conventional high energy radiation detector, the method can provide a more densely integrated structure by adding the combined PMTs, and thus greatly reduce the size of blind areas without changing the entire outer dimension of the detector.

In conclusion, the combined high energy radiation detector not only has excellent advantages in spatial and energy resolution improvement as well as imaging uniformity, but also has lower cost than those of conventional scintillation detectors.

BRIEF DESCRIPTION OF THE DRAWINGS

In FIGS. 1-4, 1 indicates a scintillation crystal array, and 2 indicates a photomultiplier tube (hereinafter referred to as PMT).

DETAILED DESCRIPTION OF PREFERRED EMBODIMENTS

The combined method for detecting and positioning high energy radiation provided by the present invention comprises the following steps:

(1) arranging scintillation crystals for capturing high energy radiation into a square array;

(2) assembling a plurality of photomultiplier tubes (PMTs) with different sizes into a combined array where a small-sized PMT is located at center of large-sized PMTs;

(3) forming a combined high energy radiation detector by directly bonding the scintillation crystal array and the combined PMT array or bonding a photoconductive material between the scintillation crystal array and the combined PMT array with an optical adhesive;

(4) generating scintillation light, when high energy radiation is incident into the scintillation crystal array of the combined high energy radiation detector; amplifying the scintillation light by the combined PMT array to form electrical pulse signals; amplifying and decoding the electrical pulse signals; and obtaining position coordinates in the scintillation crystal array of the high energy radiation through a weight distribution of the electrical pulse signals in the combined PMT array.

Figure 1:
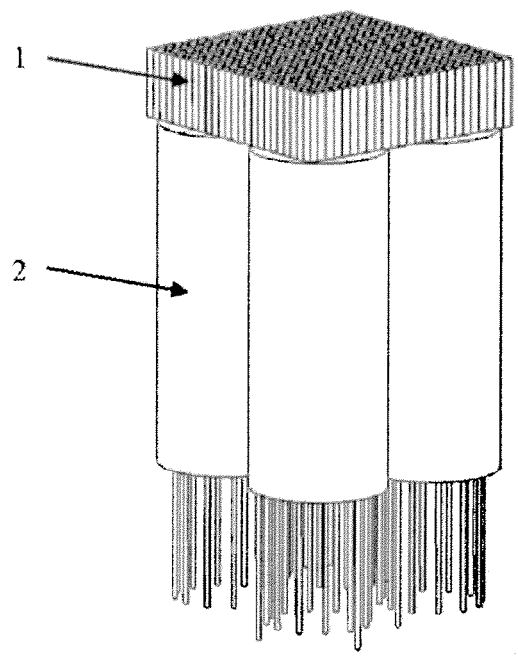
FIG. 1 is a schematic diagram showing the structure of a conventional scintillation detector.
Figure 2:
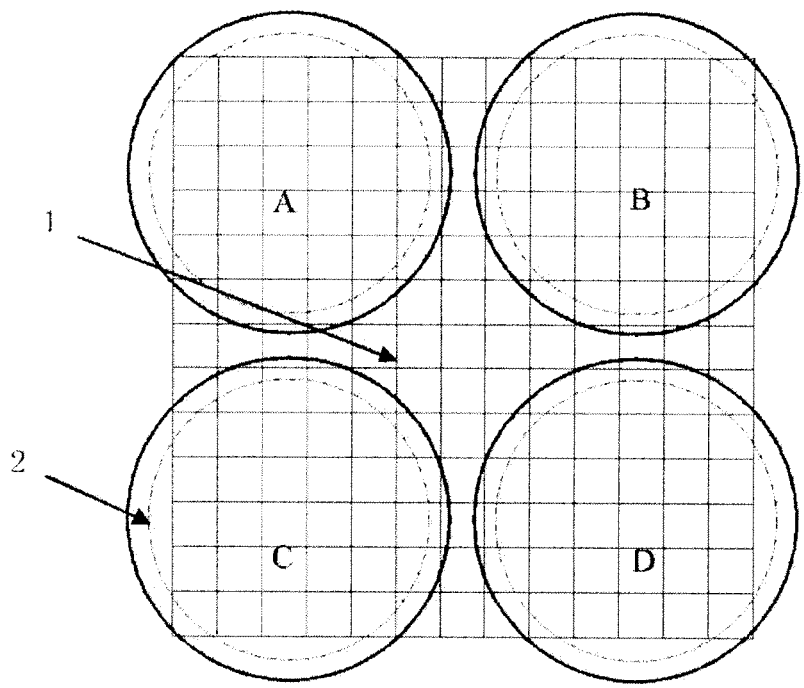
FIG. 2 is a top view of FIG. 1.
Figure 3:
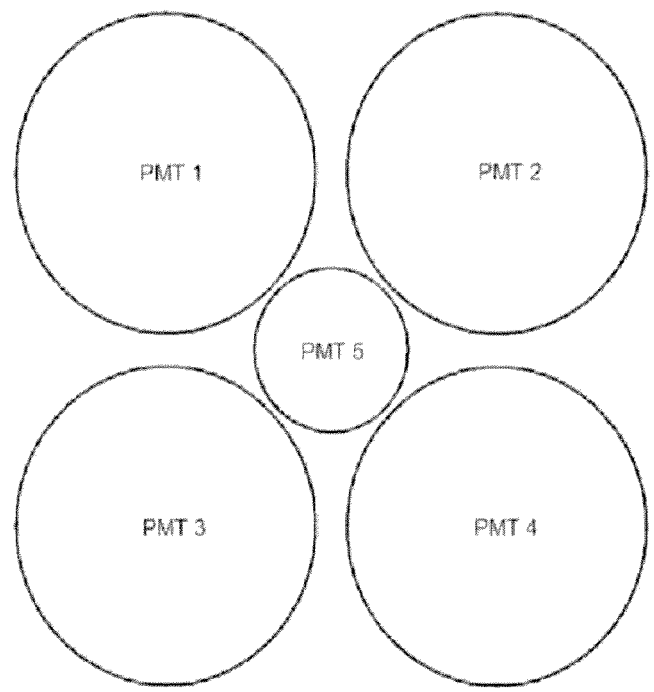
FIG. 3 is a schematic diagram showing the structure of a scintillation detector formed according to the method of the present invention.

FIG. 3 is a schematic diagram showing the structure of a scintillation detector formed according to the method of the present invention. The scintillation detector comprises two sets of circular PMTs with different sizes, wherein PMT1, PMT2, PMT3 and PMT4 have an identical diameter which is twice of that of PMT5; the PMT5 serves as a small-sized PMT clamped at the centre of a blind area of detection surrounded by the 4 large-sized PMTs. Therefore, by adding this central PMT (the PMT5), loss of scintillation light in the blind area can be effectively compensated, and thus uniformity of high energy radiation detection can be greatly improved.

Figure 4:
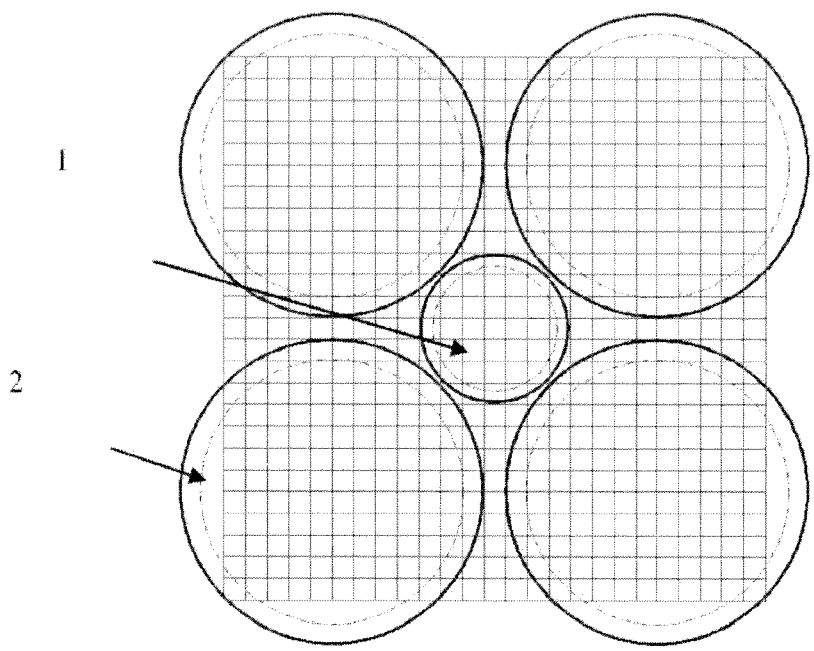
FIG. 4 is a top view of FIG. 3.

FIG. 4 is a top view of FIG. 3, where the scintillation crystal array module is coupled with the front window of the PMT array of 5 PMTs by using an optical adhesive. For scintillation light events excited by an identical high energy radiation, the signal occurrence time of the central PMT (the PMT5) can be used for characterizing the incident time of the high energy radiation; the total intensity of pulse signals of the 5 PMTs is proportional to the incident energy of the high energy radiation; and the incident position of the high energy radiation can be obtained by using a modified Anger logical positioning method. By respectively indicating the intensities of voltage signals generated by the 5 PMTs by $V_1, V_2, V_3, V_4$ and $V_5$, the spatial positions X and Y, as well as energy E of the high energy radiation can be expressed respectively as:

$$X = \frac{V_2 + V_4 + \alpha * V_5}{V_1 + V_2 + V_3 + V_4 + V_5}$$

$$Y = \frac{V_1 + V_2 + \alpha * V_5}{V_1 + V_2 + V_3 + V_4 + V_5}$$

$$E = V_1 + V_2 + V_3 + V_4 + V_5$$

where α is a weight factor, the value of which is from 0 to 1.

In the method of the present invention, the material of the scintillation crystals can be selected from any one of bismuth germinate (BGO), lutetium silicate (LSO), lutetium yttrium silicate (LYSO), gadolinium silicate (GSO), barium fluoride (BaF$_2$), sodium iodide (NaI), cesium iodide (CsI), lead tungstate (PbWO$_4$) and yttrium aluminate (YaP).

Figure 5:
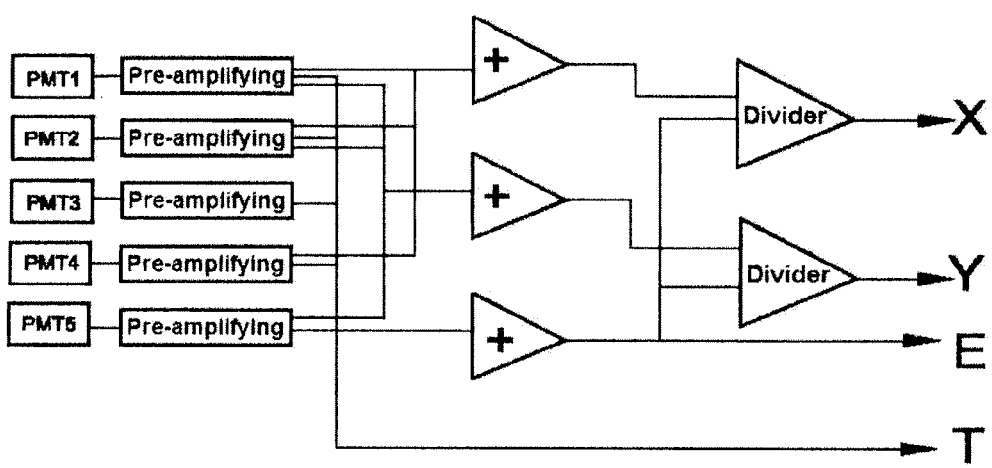
FIG. 5 is a block schematic diagram showing the signal processing process of the method of the present invention.

FIG. 5 is a block schematic diagram showing the signal processing process of the method of the present invention. The scintillation light excited by an identical high energy radiation will enable the PMTs to generate electrical pulses. After being pre-amplified and amplified, the pulse signals will be converted into voltage pulses by adding up the amplified electrical pulses by using a summing circuit. In the same way, normalized position information X and Y of the high energy radiation can be acquired by carrying out addition and division operations of the electrical pulses of some of the PMTs. Furthermore, the incident time of the high energy radiation can be obtained from the pulse signal of the central PMT.

Figure 6:
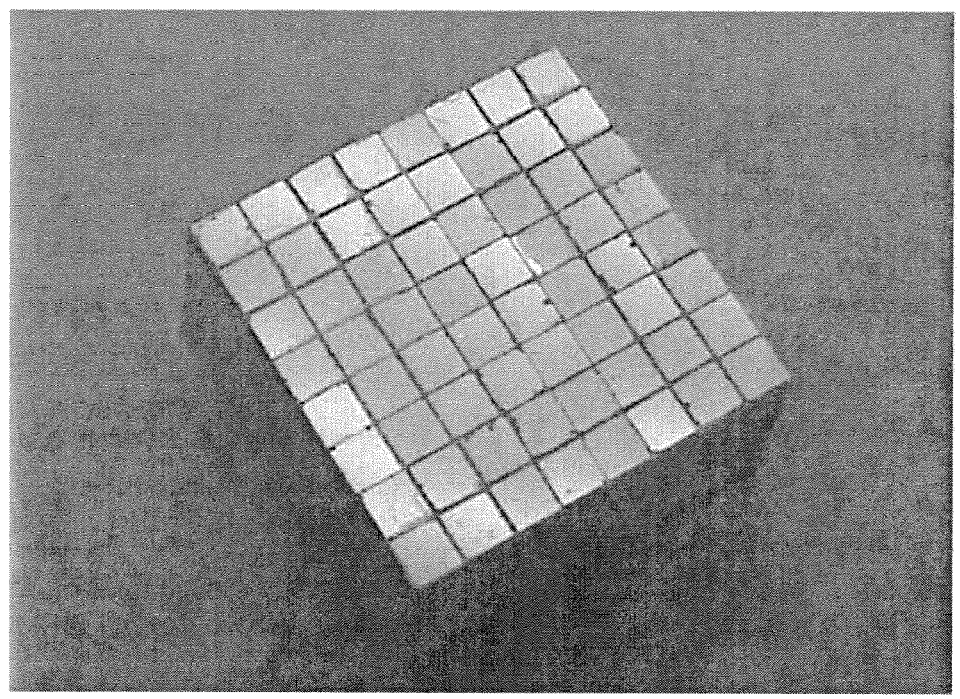
FIG. 6 is a schematic diagram showing the 8×8 array composed of BGO crystals in an embodiment of the method of the present invention.

An embodiment of the method of the present invention is shown as follows:

Experiment Conditions:

Scintillation crystal material: BGO;

Structure of the scintillation crystals: an 8×8 BGO crystal array with 8 rows and 8 columns of BGO crystal rods, each of which has a cross sectional size of 9.0 mm×9.0 mm and a length of 20 mm, as shown in FIG. 6;

Source of gamma rays: a cesium (Cs-137) point source with an intensity of 100 μCi and an energy of 662 KeV;

PMTs: 4 Photonis XP2010 PMTs (diameter: 39 mm) and 1 Photonis XP1912 PMT (diameter: 19 mm);

Number of PMTs: 5;

Gain of the PMTs: ~1×10$^6$;

Cathode voltage of the PMTs: −1100 V;

Anode voltage of the PMTs: 0 V grounded);

Results and Analysis of the Experiment:

As shown in FIG. 6, the scintillation crystals of the combined high energy radiation detector consist of an 8×8 array with 8 rows and 8 columns of BGO crystal rods; the cesium (Cs-137) gamma-ray point source is situated at 30 cm away from the detector; gamma rays are incident onto the 8×8 BGO crystal array almost in parallel; the scintillation light excited by the gamma rays is amplified by the 5 combined PMTs and then operations are performed by using an Anger logical positioning circuit; finally, information about energy, time and spatial position of the gamma rays are obtained.

Figure 7:
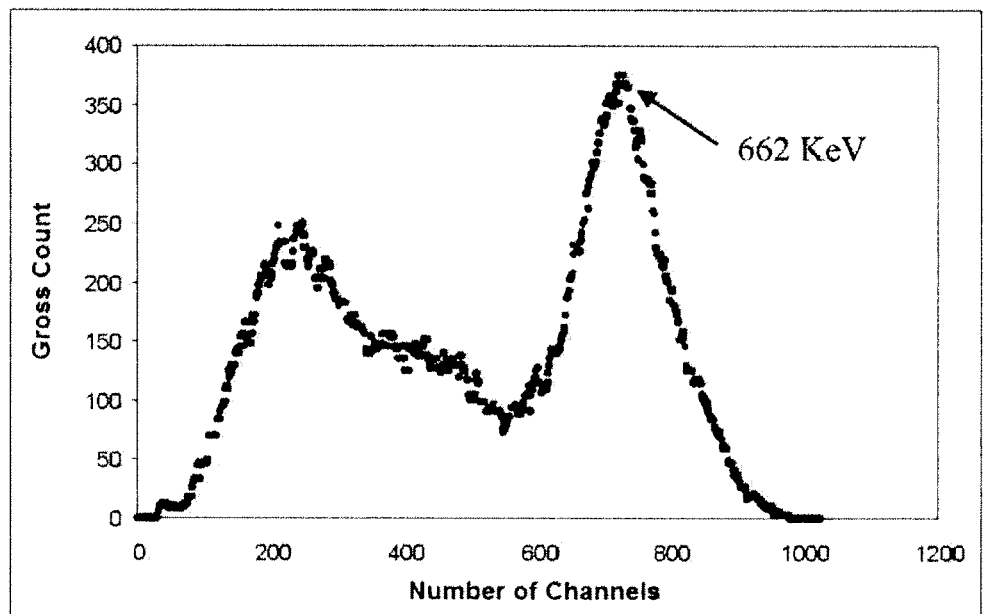
FIG. 7 shows an energy spectrum of high energy radiation from a Cs-137 source acquired in an embodiment of the method of the present invention.

FIG. 7 shows an energy spectrum of high energy radiation from a cesium (Cs-137) source captured by a combined high energy radiation detector and measured by a channel analyzer. Values in the horizontal axis are proportional to the energy of gamma rays; Values in the vertical axis shows the counting rate corresponding to the energy. The maximum peak position corresponds to the characteristic energy (662 KeV) of the gamma rays emitted from the Cs-137 source. The energy resolution of the scintillation detector with microchannel plate type is 21%.

Figure 8:
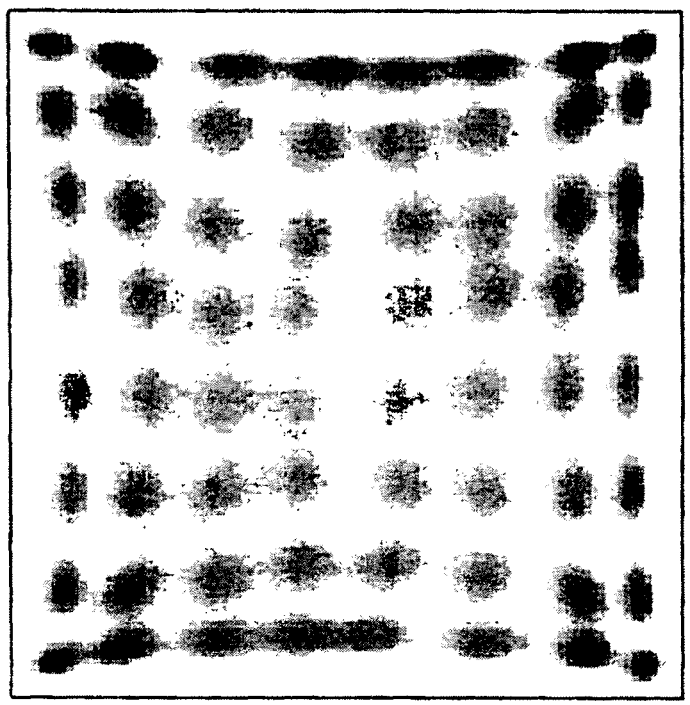
FIG. 8 is an image of high energy radiation detected by the method of the present invention.

FIG. 8 shows an image of high energy radiation detecting, namely the spatial distribution pattern of the incident position of high energy radiation, performed by the combined method for detecting and positioning of high energy radiation of the present invention. The 8×8 lattice structure is clearly visible; the grayness of the image stands for counting rates; the darker a position shows in the image, the higher the intensity of a gamma ray incident on the position is. The cross sectional size of a single BGO crystal rod of the combined high energy radiation detector is 9 mm; the total counting number of the gamma rays is 10$^5$.

What is claimed is:

1. A combined method for detecting and positioning high energy radiation, comprising the following steps:

arranging scintillation crystals for capturing high energy radiation into a square array;

assembling a plurality of photomultiplier tubes (PMTs) with different sizes into a combined array, wherein, the PMTs comprise 4 larger-sized PMTs and 1 smaller-sized PMT; the larger-sized PMTs are arranged in quadrangular symmetry; the smaller-sized PMT is located at center of the 4 larger-sized PMTs;

forming a combined high energy radiation detector by directly bonding the scintillation crystal array and the combined PMT array or bonding a photoconductive material between the scintillation crystal array and the combined PMT array with an optical adhesive;

generating scintillation light when high energy radiation is incident into the scintillation crystal array of the combined high energy radiation detector; amplifying the scintillation light by the combined PMT array to form electrical pulse signals; amplifying and decoding the electrical pulse signals; and obtaining position coordinates in the scintillation crystal array of the high energy radiation through a weight distribution of the electrical pulse signals in the combined PMT array;

wherein the electrical pulse signals are decoded according to the following method: an X-axis direction position coordinate of the high energy radiation in the scintillation crystal array is calculated by dividing a total intensity sum of the electrical pulse signals of all the PMTs in the X-axis direction by a total intensity sum of the electrical pulse signals of all the PMTs; a Y-axis direction position coordinate of the high energy radiation in the scintillation crystal array is calculated by dividing a total intensity sum of the electrical pulse signals of all the PMTs in the Y-axis direction by the total intensity sum of the electrical pulse signals of all the PMTs; energy of the high energy radiation is calculated by adding up intensities of the electrical pulse signals of all the PMTs;

wherein during decoding the electrical pulse signals, spatial positions X and Y, as well as energy E of the high energy radiation are expressed respectively as:

$$X = \frac{V_2 + V_4 + \alpha * V_5}{V_1 + V_2 + V_3 + V_4 + V_5}$$

$$Y = \frac{V_1 + V_2 + \alpha * V_5}{V_1 + V_2 + V_3 + V_4 + V_5}$$

$$E = V_1 + V_2 + V_3 + V_4 + V_5$$

wherein intensities of the electrical pulse signals generated by the 4 larger-sized PMTs are respectively indicated by $V_1$, $V_2$, $V_3$ and $V_4$, and intensity of the electrical pulse signal generated by the smaller-sized PMT is indicated by $V_5$;

where $\alpha$ is a weight factor, the value of which is from 0 to 1;

for the scintillation light excited by identical high energy radiation, an occurrence time of the electrical pulse signal generated by the central PMT can be used for characterizing an incident time of the high energy radiation;

total intensity of the electrical pulse signals of the 5 PMTs is proportional to an incident intensity of the high energy radiation.

2. The method according to claim 1, wherein the material of the scintillation crystals can be selected from any one of bismuth germinate, lutetium silicate, lutetium yttrium silicate, gadolinium silicate, barium fluoride, sodium iodide, cesium iodide, lead tungstate and yttrium aluminate.

3. The method according to claim 1, wherein any one of organic plastics, glass and optical fibers can be selected as the photoconductive material.

* * * * *